(12) United States Patent
Lalonde et al.

(10) Patent No.: US 7,106,966 B1
(45) Date of Patent: Sep. 12, 2006

(54) INTEGRATED PHOTONIC SWITCH

(75) Inventors: Frederick J. Lalonde, Ottawa (CA); Peter D. Roorda, Hertford (GB); Alan Glen Solheim, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 881 days.

(21) Appl. No.: 09/584,363

(22) Filed: Jun. 1, 2000

(30) Foreign Application Priority Data

Mar. 15, 2000 (CA) ................................ 2300780

(51) Int. Cl.
*H04J 14/00* (2006.01)

(52) U.S. Cl. ........................... 398/46; 398/45; 398/48; 398/49; 385/17; 385/18; 385/19; 385/31

(58) Field of Classification Search ................. 385/17, 385/19, 18, 31; 398/46, 48, 49, 45; 359/838; 438/109

See application file for complete search history.

(56) References Cited

U.S. PATENT DOCUMENTS

| 5,623,356 | A * | 4/1997 | Kaminow et al. ............. 398/46 |
| 5,878,177 | A * | 3/1999 | Karasan et al. ................ 385/17 |
| 5,960,132 | A | 9/1999 | Lin |
| 6,445,841 | B1 * | 9/2002 | Gloeckner et al. ............. 385/17 |
| 6,466,711 | B1 * | 10/2002 | Laor et al. ..................... 385/18 |
| 6,647,209 | B1 * | 11/2003 | Boord et al. .................... 398/84 |

FOREIGN PATENT DOCUMENTS

| EP | 0 752 794 A2 | 1/1997 |
| EP | 0 933 964 A2 | 8/1999 |
| EP | 1 091 614 A2 | 4/2001 |
| WO | WO 97/30529 | 8/1997 |
| WO | WO 00/52835 | 9/2000 |
| WO | WO 00/76101 A1 | 12/2000 |

OTHER PUBLICATIONS

Bononi et al., "Analysis of Hot-Potato Optical Networks with Wavelength Conversion", Journal of Lightwave Technology, Apr. 1999, 10 pages, vol. 17.

* cited by examiner

*Primary Examiner*—David C. Payne
(74) *Attorney, Agent, or Firm*—Borden Ladner Gervais LLP

(57) ABSTRACT

The integrated photonic switch can be used in all-optical networks. incoming multiplexed signals from a number of input fiber ports are separated into their component wavelengths. Individual wavelengths are switched within the switch fabric towards the desired output, and the wavelengths are then multiplexed into WDM signals directed to the appropriate output ports. The multiplexer and demultiplexer are diffraction grating devices, integrated with the switch fabric. The switch fabric includes two matrices of 3-D MEMS mirrors arranged in the same plane, or in two parallel planes. The optical path between the input ports, the demultiplexer and the input matrix is pre-set so that each wavelength is incident on a certain mirror. Similarly, the geometry of the output matrix, the multiplexer and the output ports determines uniquely the wavelengths on a certain port. However, the position of the mirrors may be adjusted with a control system, so that the path of a wavelength within the switch fabric is adjustable, so that a wavelength input on a port may output the switch on any port.

25 Claims, 5 Drawing Sheets

INTEGRATED PHOTONIC SWITCH

BACKGROUND OF THE INVENTION

1. Field of the Invention

This invention relates to optical switches and is particularly concerned with switching optical signals composed of light of predetermined wavelengths, for example, Wavelength Division Multiplexed (WDM), Dense WDM (DWDM), or Coarse WDM (CWDM) optical signals used in optical telecommunications.

2. Background Art

Optical transmission systems achieve their end-to-end connectivity by concatenating multiple spans between intermediate switching nodes. When the end-to-end granularity of any given transmission path is a fraction of the capacity of a given optical carrier, time division multiplexing (TDM) protocols are applied, which share the overall bandwidth of a carrier signal. In this case, the individual signals (tributaries) are switched electronically at the intermediate nodes, since individual tributaries can only be accessed by demultiplexing the TDM signal.

On the other hand, Wavelength Division Multiplexing (WDM), and particularly DWDM and CWDM transmission can provide manifold capacity expansion on existing fibre links. DWDM optical networks transmit multiple channels (wavelengths) on each optical fiber in the network. The result is a plurality of channels on each fiber, a channel carrying information between two terminals in the networks. An advantage of the WDM networks is that conversions between the optical and electrical domains take place practically only at the periphery of the transport network. The signals are add/dropped and amplified within the network in optical format.

However, current WDM optical networks typically convert channel signals into electrical signals at every switching node in the network because optical switches having sufficiently large enough port counts are not available, nor is optical reach sufficient. Conversion is performed using transmitters (Tx), receivers (Rx), transceivers (Tx-Rx pair) or transponders at every port of the switching node, and for every channel. (Transponders are devices that convert the signal between the optical and electrical domains, and also translate the wavelength of the channels at the border between the long and short reach networks.)

These converters are expensive. As the number of channels carried by an optical fiber increases, the required accuracy of the converters also increases, and hence the cost. Moreover, as the number of ports per switching node increases, the required number of converters also increases. Consequently, large networks carrying dense DWDM signals require many costly converters and are therefore costly to build.

There is a substantial advantage in designing optical transmission networks such that the majority of the channels (wavelengths) can be routed end-to-end via optical switches and optical amplifiers, without the use of converters (e.g. transponders) on a per channel wavelength basis at intermediate sites or nodes. This leads to a need for an optical cross-connect switch optimized for routing wavelengths from end to end, as opposed to a large opaque optical switch fabric placed between banks of transponders.

There are proposals to build large, purely optical switches that offer full connectivity between all their ports. However, fabrication of these large optical switches has proven difficult. Currently, large non-blocking optical switches use a large number of switch modules. One example of this envisages building a 128 port×128 port switch out of three stages of multiple 16×16 crosspoint matrices, or a 512×512 port switch out of three stages of multiple 32×32 crosspoint matrices, in a three stage CLOS architecture. The above is based on the availability of 16×16 or 32×32 switch matrices in the form of Micro-Electro-Mechanical (MEM) switch matrices (described in e.g. "Free-space Micromachined Optical-Switching Technologies and Architectures", Lih Y. Lin, AT&T Labs-Research, OFC99 Session W14-1, Feb. 24, 1999).

Other multi-stage approaches use smaller matrices and more stages. Even the 3 stage CLOS architecture is limited to 512–1024 switched wavelengths with 32×32 switch matrix modules, which, in today's 160 wavelength per fiber DWDM environment, is only adequate to handle the output/input to 3 fiber pairs (480 wavelengths). In addition, current multi-stage switches have significant problems, even at three stages. These problems include high overall optical loss through the switch, since the losses in each stage are additive across the switch, and there is the potential for additional loss in the complex internal interconnect between the stages of the switch. Size limitations in terms of the number of wavelengths switched can be overcome by going to a five stage CLOS switch, but this further increases the loss through the switch as well as it adds to its complexity and cost. In addition, a CLOS switch requires a degree of dilation (i.e. extra switch paths) to be non-blocking and each optical path has to transit three (or five) individual modules in series.

MEM mirrors technology has evolved lately. The '3-D MEMS' devices have emerged as the photonic switch technology of choice for large fabric switches. 3-D MEMS is a term used by the Applicant for a mirror mounted on a frame that can be rotated along two axes, giving it four degrees of freedom. The 3-D MEMS devices are arranged preferably in a matrix, which comprises besides the mirrors a control system for positioning the mirrors independently.

SUMMARY OF THE INVENTION

It is an object of the invention to provide an integrated photonic switch that alleviates totally or in part the drawbacks of the current switches.

Another object of the invention is to provide a photonic switch for use in WDM/DWDM/CWDM networks, which switches individual wavelengths (channels) for a certain input fiber to a selected output fiber.

According to one aspect of the invention there is provided a photonic switch for a DWDM network comprising, a plurality l of input ports and a plurality l' of output ports, an optical demultiplexer for separating said wavelength $\lambda_k$ from an input multichannel signal Sin(k,i) received on an input port i, and directing same on an assigned ingress area along a predetermined input path, a switching block for directing a wavelength $\lambda_k$ along an optical path from an assigned ingress area to an associated egress area selected from a plurality of egress areas, and an optical multiplexer for directing said wavelength $\lambda_k$ from said associated egress area along a predetermined output path, and combining same into an output multichannel signal Sout(k',i'), transmitted on a port i'.

According to further aspect of the invention, there is also provided a method of routing a wavelength within a photonic switch of a DWDM network, comprising, pre-establishing an input optical path between an input port associated with said wavelength and an assigned optical switching element of an input matrix, according to a connectivity map, establishing an adaptable path from said assigned optical switching element to an associated optical switching element of an output matrix; and pre-establishing an output optical path between said associated optical switching element and an output port of interest according to said connectivity map.

In yet another aspect of the invention there is provided a photonic switch for routing a plurality of wavelengths of a DWD transport network, between a plurality of input ports and a plurality of output ports comprising, an all-optical switch fabric for cross-connecting a wavelength $\lambda_k$ from an optical input multichannel signal Sin(k,i) to an optical output multichannel signal Sout(k',i'), along an adaptable optical path, and a control unit for configuring said adaptable optical path.

The invention provides a cost-effective, low-loss system of providing wavelength interchange between multiple WDM line systems. Photonic switch according to the invention is also a key enabler for ultra long-reach networks, as it can provide availability and flexibility benefits without conversion of the signals between the optical and electrical domain.

Looking at a photonic switch node, this invention provides significant savings in, or elimination of, filters, amplifiers, connectors, patch-cords, fiber shuffles. Also, the savings in fiber management operations (footprint, power, set-up time, etc) could be important.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

Figure 1:
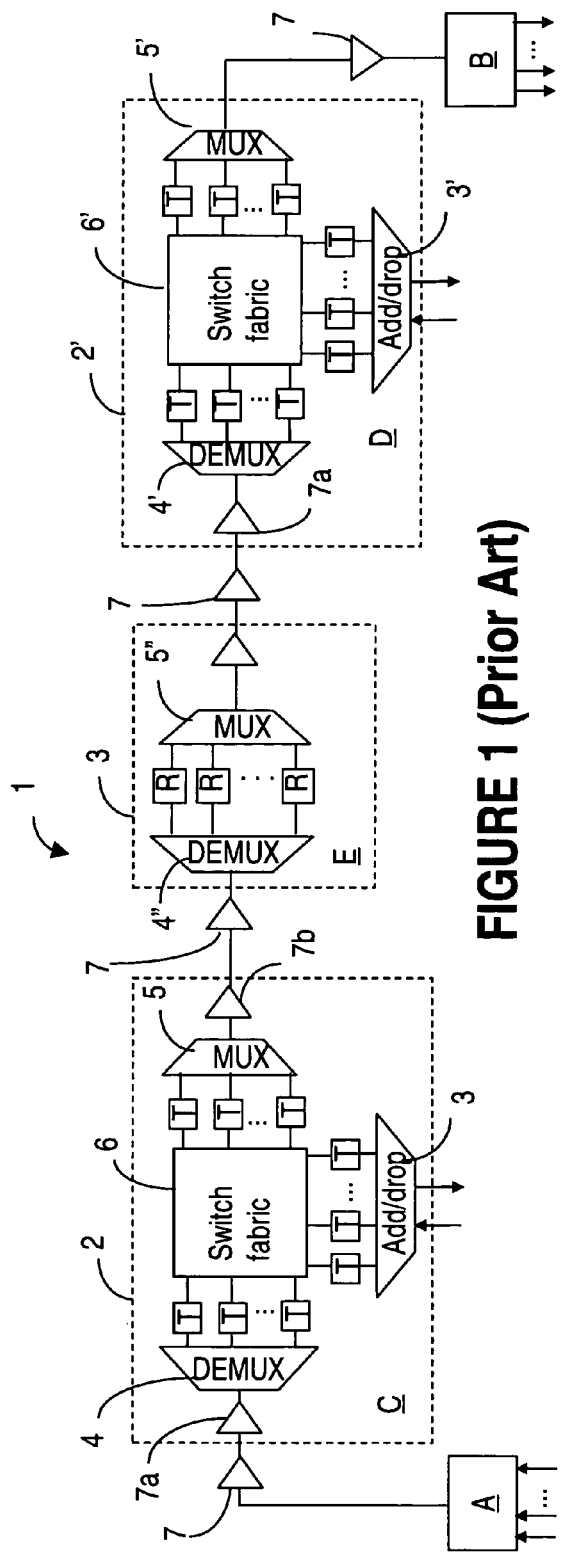
FIG. 1 shows a portion of an optical network with electrical cross-connects.

FIG. 1 shows a portion of an unidirectional optical network 1, connecting two path terminals A and B. Network 1 includes two switch sites C and D, and a regenerator site E, interconnected by spans of optical fibers. Optical amplifiers 7 are spaced apart at appropriate intervals along the spans, for amplifying all the individual channels in the WDM signal, without conversion.

The terminal at site A converts a plurality of electrical signals input to the optical network 1 to optical signals, and combines the optical signals into a WDM signal. At the far end B, the WDM signal is demultiplexed into individual optical signals, which are converted back to electrical signals.

Switch sites C and D are provided with electrical cross-connects 2 and respectively 2'. An electrical cross-connect (switch) 2, 2' comprises at the input side, an optical demultiplexer 4, 4' coupled to an electrical switch fabric 6, 6'. The signals are independently cross-connected between the input and output ports by switch fabric 6, 6', as needed. An optical multiplexer 5, 5' is coupled at the output side of the electrical switch fabric 6, 6'. Switch node C is also provided with an optical add/drop multiplexer (OADM) 3 for effecting add/drop operations. Namely, OADM 3 separates the traffic addressed to a local user (drop operation) and adds local traffic at the output of the switch, for a remote user (add operation). Similarly, OADM 3' effects add/drop operations at node D.

As conversion of signals is necessary before and after switching, sites C and D must be provided with transponders T for each channel for O/E and E/O conversion, respectively. It is to be noted that blocks marked T in FIG. 1 are not necessarily transponders, they could be transceivers, i.e. receiver-transmitter (Rx-Tx) pairs, without frequency translation. As well, for the example of FIG. 1 (unidirectional flow of traffic), these blocks assume the role of a receiver at the input side of the signal and a transmitter at the output side, as appropriate.

Currently, demultiplexing, multiplexing and add/drop operations are effected with filters and patchcords between the switch and the filter for each wavelength, resulting in a high loss through sites C and D. An optical pre-amplifier 7a is generally provided at the input of demultiplexer 4, 4' to amplify the received WDM signals before switching. Similarly, a post-amplifier 7b is generally provided at the output of multiplexer 5, 5' to amplify the transmitted WDM signals after switching.

Network 1 also requires signal regeneration. A regenerator site, such as site E is generally provided with repeaters 3 comprising demultiplexers 4" coupled to multiplexers 5" via regenerators R. This site also requires an additional pair of transponders per channel signal, (not shown, being included in the regenerators R).

To summarize, it is apparent that current WDM configurations require a pair of transponders at each site for each channel signal passing through switches 2, 2'. Further, additional transponders are required to add or drop channel signals to/from the switch 2. Network 1 also requires regeneration of the signals. Furthermore, any increase in the number of channels (wavelengths) in a WDM signal requires an additional pair of transponders in every switch 2 and every repeater 3.

Figure 2:
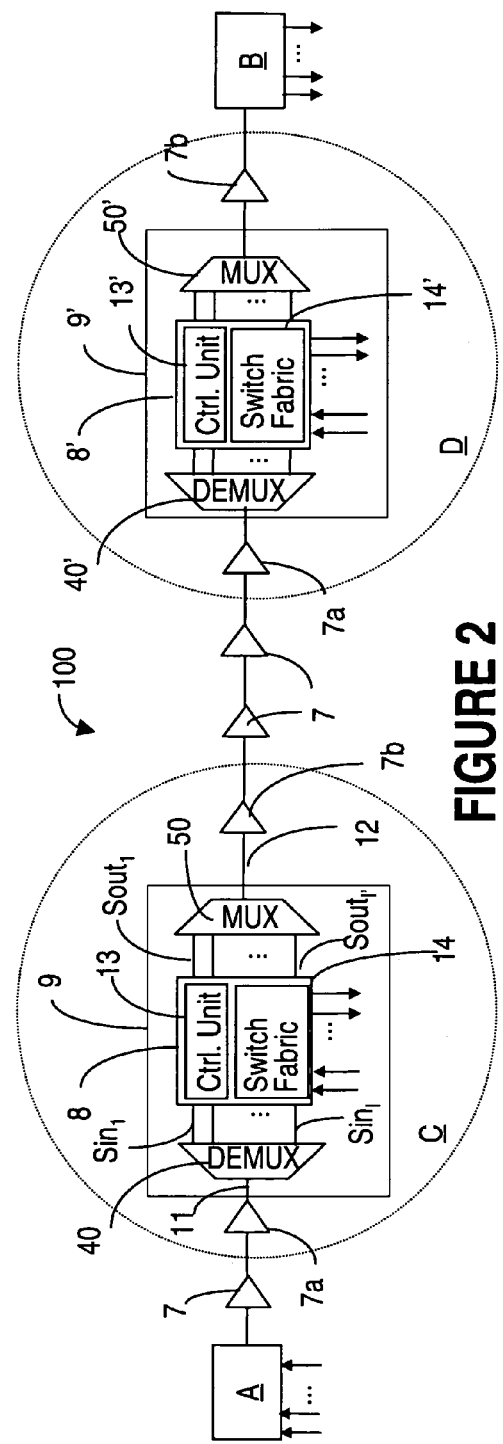
FIG. 2 shows the block diagram of an optical network with photonic switching according to the invention.

FIG. 2 shows a network 100 using a photonic switch according to the present invention. It is evident that since the switching and the add/drop operations are effected in the optical domain, no transponders are necessary, resulting in important saving of equipment at the switching nodes C and D, as well as a lower loss.

The photonic switch 9, 9' at sites C and respectively D comprises a demultiplexer 40, 40', a multiplexer 50, 50' and a switching block 8, 8'. The switching block includes switch fabric 14, made for example of 3D-MEMS matrices. However, the configuration of the switch fabric 14 according to the invention is not limited to using 3D-MEMS devices; any other devices able to redirect the light with more than four degrees of freedom can equally be used for the switch fabric 14.

Switching block 8, 8' also has a control unit 13, 13' for controlling the path of the wavelengths within the switch fabric from the input ports (connectors) to the output ports, by adequately orienting the 3D-MEMS devices.

The input span 11 and output span 12 in FIG. 2 comprise a plurality of input and output fibers and the associated ports, each carrying a respective multi-channel (DWDM) input/ output optical signal. The number of the input ports is generally equal with the number of the output ports, but it could also be different in some applications. Therefore, we note here the total number of input ports with l and the number of output ports with l', so that an input port is designated by index i and an output port by index i. We also denote the maximum number of channels (wavelengths) on an input port with K, the maximum number of channels (wavelengths) on an output port with K' the range of an input channel on a port with k, and the range of an output channel on a port with k'. In this way, an input multichannel signal is denoted with Sin(k,i) and an output multichannel signal is denoted with Sout(k',i').

The switch node C, D may also be provided with pre-amplifiers, such as 7a, and post-amplifiers, such as 7b, depending on the specifics of the application.

Photonic switches 9 and 9' shown in FIG. 2 have a different structure and mode of operation form the electrical cross-connects at nodes C and D in FIG. 1. Besides the differences in the configuration and mode of operation of the switch fabric 14, the optical demultiplexer 40 and multiplexer 50 have also a different structure than the demultiplexer 4 and multiplexer 5 shown in FIG. 1. Also, the photonic switch 9, 9' performs add/drop operations in a specific way, without the need of individual OADM's such as 3, 3'. This arrangement results in a significantly lower loss through the photonic switch than in the current arrangement of fiber patchcords for every wavelength.

Figure 3A:
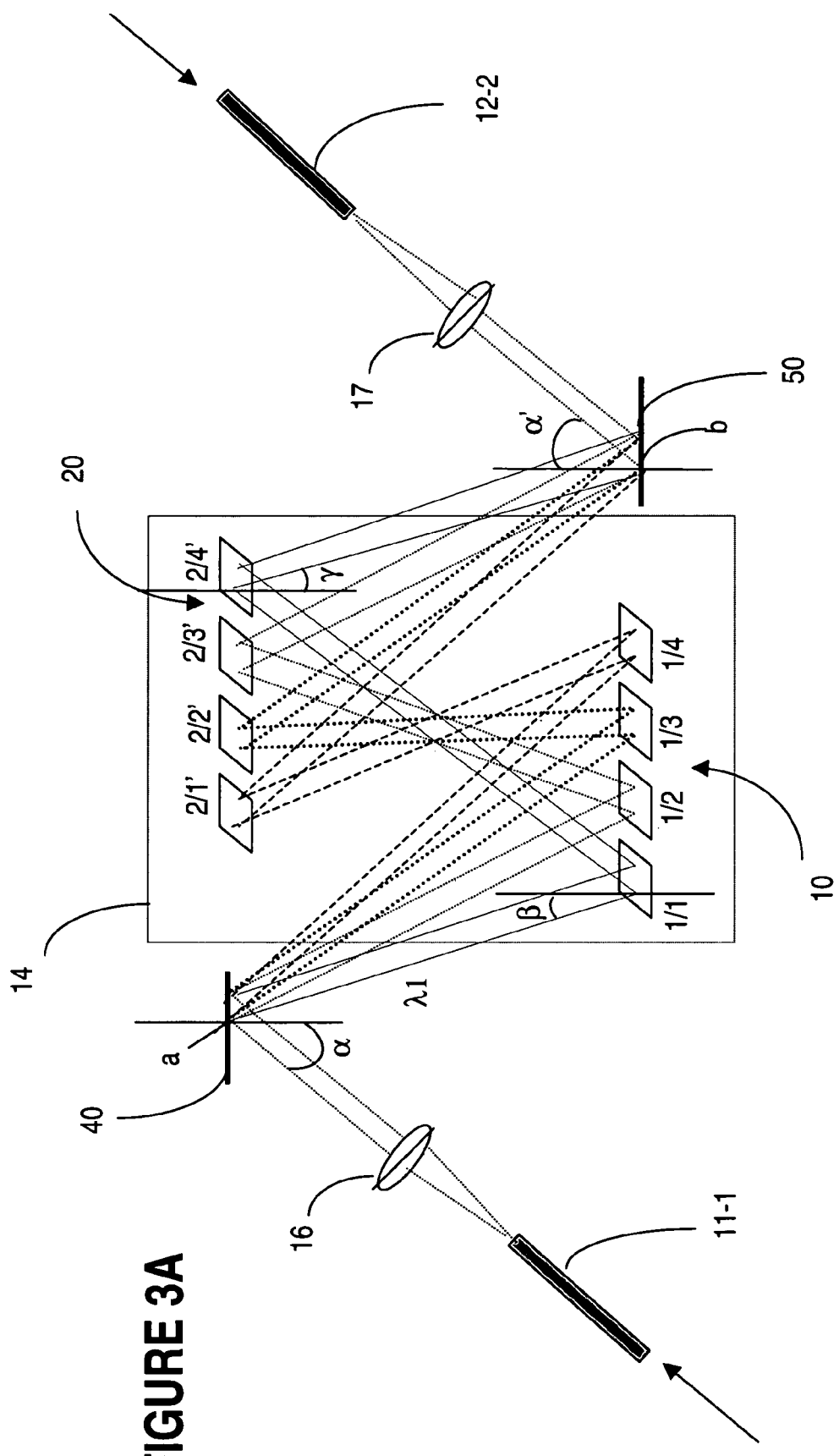
FIG. 3A is a diagram of one plane for an embodiment of the photonic switch.
Figure 3B:
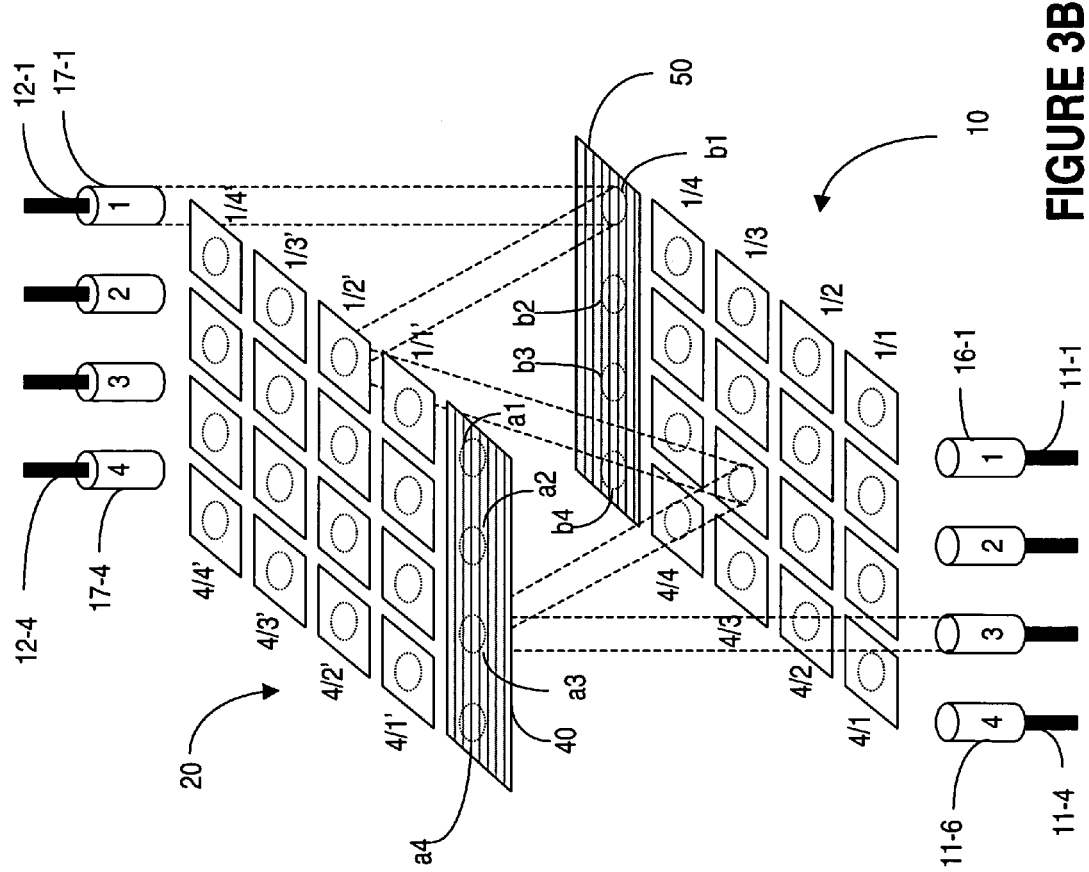
FIG. 3B is a spatial view of the embodiment in FIG. 3A showing a switching operation.
Figure 3C:
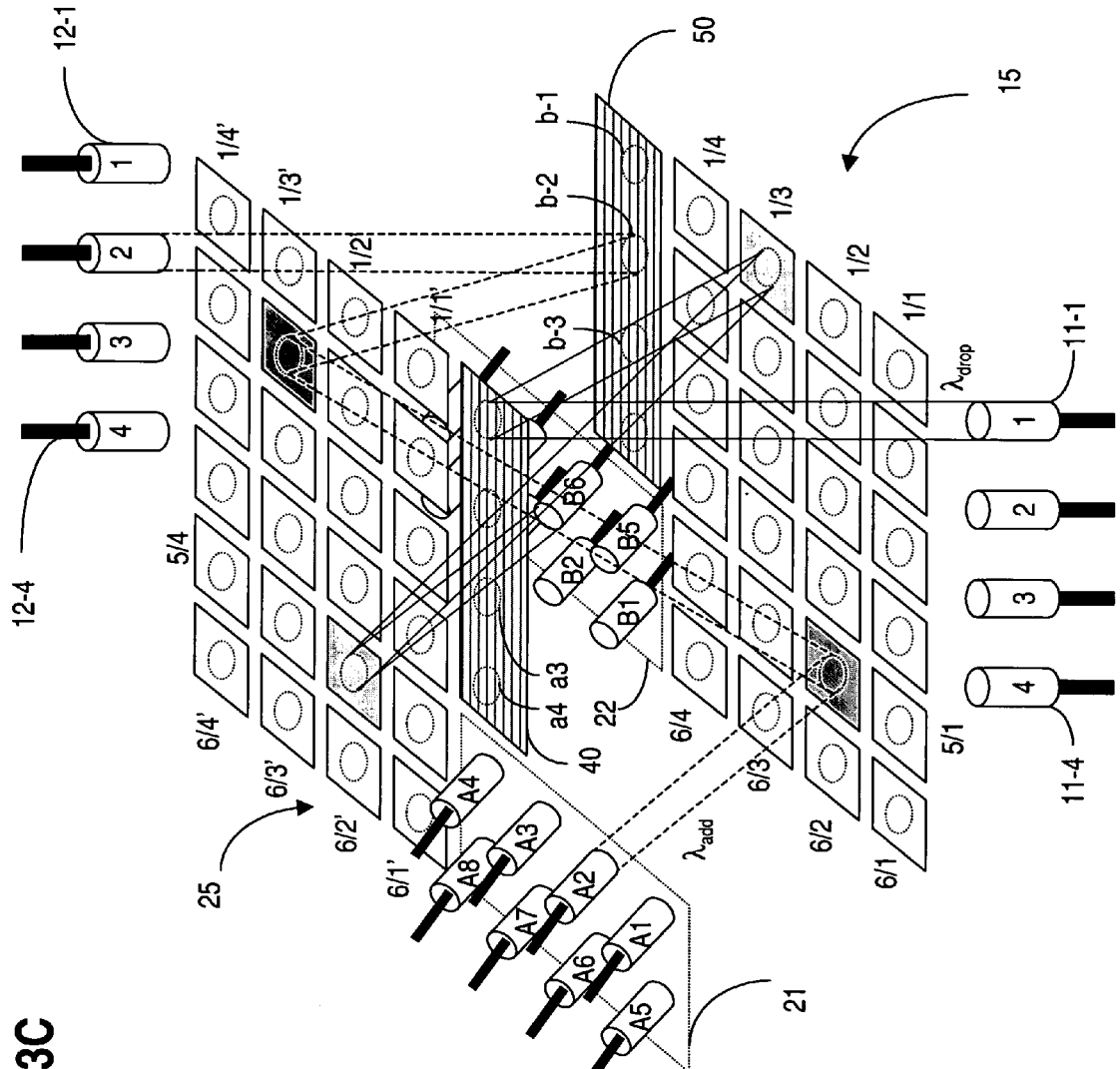
FIG. 3C is a spatial view of an embodiment of the photonic switch with add/drop capabilities.

FIG. 3A is a diagram of an embodiment of the photonic switch 9, which is shown in a spatial view in FIGS. 3B and 3C. FIGS. 3A–3C do not illustrate the control unit 13 and some optical elements that are not relevant to the ensuing description.

Also, FIG. 3A is intended to show how the wavelengths are demultiplexed at the input side of the switch and multiplexed at the output side. As indicated above, the total number of input ports (fibers) is denoted with l and the number of output ports with l', so that the input fibers (ports) are denoted with 11-1 ... 11-i ... 11-l and the output fibers (ports) are denoted with 12-1, ... 12-i', ... 12-l'. For simplicity, this drawing shows four input wavelengths and four output wavelengths in one plane of the switch. The wavelengths input on fiber 11-1 in this example are output on fiber 12-2. In fact the switch operates according to a wavelength map which results in moving some wavelengths from an input multichannel signal to an output multichannel signal, so that the wavelengths are grouped (multiplexed) differently in the input and output signals. This is shown explicitly in FIGS. 3A and 3B, described later.

The switch fabric 14 comprises in this embodiment two matrices of 3-D MEMS devices 10 and 20 arranged in two planes. A 3D MEMS device is identified within the respective matrix by a row number (k) and column number (i). Thus, mirror 4/3 is located in the row 4 and column 3 of the matrix 10. The matrices need not necessarily be parallel to each other, as long as the trajectory of each wavelength is carefully engineered as described in the following.

The example of FIGS. 3A, 3B and 3C is for l=l'=4, and K=K'=4. It is to be understood that the number of fibers and of wavelengths are by way of example only, and that the photonic switch can cross-connect a much larger number of wavelengths between a larger number of fibers.

At the input side of the switch 9, input signal Sin(k,i), here Sin(4,1) received on input fiber 11-1 is separated into four component wavelengths (K=4) by demultiplexer 40, as also shown in FIG. 2. The demultiplexer is in this example a diffraction grating 40. Fiber 11-1, as well as all remaining input fibers, is aligned to direct the incoming light on collimating lens 16, which in turn directs the wavelengths on diffraction grating 40 on a certain area (spot) noted with a, and at an angle of incidence α. The term spot is used herein to define the area of incidence of a beam of light, as shown in FIG. 3A by letters a and b, and as intuitively shown for example in FIG. 3B by dotted circles marked a1 to a4 and by to b4.

The diffraction grating 40 reflects each wavelength in the incoming signal Sin(4,1) on a certain 3-D MEMS device of matrix 10, at an angle of incidence β. The input fiber/port 11-1, diffraction grating 40 and matrix 10 are placed in a predetermined relationship with respect to each other by pre-setting angles α and β. The angles may be pre-set so that each wavelength input from fiber 11-i is incident on a mirror in length i, e.g. λ1 is received on mirror 1/i, λ2 on mirror 2/i, ... λk on mirror k/i, ... and λK on mirror K/i. Preferably fiber 11-1 is associated with column i=1, fiber 11-2 with column i=2, etc.

In turn, the mirrors of array 10 direct the respective incident wavelength on a target mirror of MEMS matrix 20. In the example of FIG. 3A, mirror 1/1 sends λ1 on mirror 2/1' of MEMS array 20, mirror 1/2 sends λ2 on mirror 2/2', mirror 1/3 sends λ3 on mirror 2/3' and mirror 1/4 sends λ4 on mirror 2/4'. As the mirrors can rotate about two axes, each mirror can redirect wavelength λ1 on any mirror of matrix 20 according to the position of mirror in matrix 10 its orientation (angle β). Angle β may be adjusted as needed by control unit 13.

Mirrors of matrix 20 can also rotate about two axes, and each mirror is set to redirect the light towards multiplexer 50. The angle β varies with the position of the mirror in matrix 20, angle β, and the orientation of the mirror. The orientation of the 3-D MEMS devices in the matrix 20 is adjusted as needed by control unit 13.

Diffraction grating 50 operates as a multiplexer, in that it combines light beams into an output multichannel signal Sout(k',i'), here Sout(4,2) according to the wavelength and the spot of incidence b, and directs signal Sout(4,2) on a respective output fiber 12. Again, the wavelength-output port-mirror assignment is preferably predetermined.

The output of the photonic switch 9 is also provided with a focusing lens 17, for focusing the wavelengths form spot b on the fiber 12-2.

It is to be understood that other passive optical elements such as connectors, lenses, etc. may be provided for adjusting the light trajectories in the switch 9. Such elements are however not shown or described, as they are well known to persons skilled in the optical physics, and also as they are not relevant to the principle of operation of the present invention.

To summarize, there are constrains between the diffraction gratings 40 and the matrix 10, and between diffraction gratings 50 and matrix 20. As light from the input fiber 11-1 hits grating 40, it is split into its component wavelengths. In order to position the matrix 10 in relation to the gratings 40, the component wavelength map must be known in advance. If the wavelengths change, the mirrors would be out of position. However, as there exists standard wavelengths maps (defined by ITU), this should not occur. If a mirror in matrix 10 has been properly positioned to reflect a particular wavelength, only that wavelength can be incident on that mirror.

The reverse is true for the positioning of mirrors in matrix 20 that direct wavelengths to the grating 50 which multiplexes them up and directs them to the output fibers. If a wavelength is incident on a mirror in matrix 20 that is not the correct wavelength, as defined by the geometry of the mirror, grating and output port, it cannot be directed to the output port. This is actually an advantage of the arrangement in the invention, as it disallows equivalent wavelengths from being directed onto the same output fiber. It also avoids interference with other channels in the event a channel wanders from its center wavelength.

FIG. 3B shows a perspective view of a switch fabric with 3-D MEMS matrices 10 and 20, for switching 4-channel signals input on four fibers 11-1 to 11-4 to output fibers 12-1 to 12-4. The control unit, the focusing lens and collimating lens are not illustrated, for simplification.

Since the number of wavelengths and of the ports is four in this example, each matrix has 4×4 3-D MEMS devices. Four input fibers and four output fibers are shown, each carrying 4 wavelengths. Clearly, matrices with more/less mirrors may equally be used, according to the application. It is also possible to have differently sized first and second matrices. In the general case, for l input fibers, and l' output fibers, a maximum of K wavelengths on each input fiber and K' on each output fiber, matrix 10 has l columns and K rows, and matrix 20 has K' rows and l' columns.

The demultiplexer 40 receives the input DWDM signals from the input fibers and separates each DWDM signal into component channels (wavelengths). Thus, the multichannel signal Sin(4,1) from fiber 11-1 is directed on spot a1, the multichannel signal Sin(4,2) from fiber 11-2 is directed on spot a2, etc. A channel λk of Sin(k,i) is directed on a first 3-D MEMS mirror k/i of the first matrix 10, according to the port (i) on which it arrives at the switch, and the position of spot a and the wavelength λk. In FIG. 3B, wavelength λ3 arriving to the photonic switch 9 over fiber 11-3 is directed by diffraction grating 40 from spot a3 onto first mirror 3/3.

From matrix 10, the wavelength is reflected towards a mirror in matrix 20. The second mirror is selected in matrix 20 by the control unit 13, which adjusts the orientation β of the first mirror, according to the current wavelength map. Each mirror of matrix 20 directs the channel incident on it towards the multiplexer 50 on one of spots b-1 to b-4, depending on the β of the first mirror, the position of the second mirror in matrix 20, and the orientation γ of the second mirror. In FIG. 3B, wavelength λ3 is reflected by mirror 3/3 on mirror 1/2', which in turn directs this wavelength on diffraction grating 50 spot b-1, for multiplexing it with other wavelengths arriving on spot b-1 and intended to travel over fiber 12-1.

FIG. 3C shows a spatial view of a photonic switch 9 with integrated add/drop, and examples of add and drop operations. It is again noted that according to the invention, there is no need to provide a separate OADM. 3D-MEMS matrix 15 provides the add functionality, at while 3D-MEMS matrix 25 provides the drop functionality. The matrices 15 and 25 have an extended number of columns, namely they have in the example of FIG. 3C two additional columns 5 and 6, which could serve 2×4 add ports 21 and 2×4 drop ports 22 respectively. The fibers/ports receiving the add channels are denoted with A1–A8 on FIG. 3C, whnd the fibers/ports transmitting the drop channels are denoted with D1–D8. The add/drop operations use these zones, and therefore the zone on matrix 15 defined by rows 1–4 an columns 5, 6 is the add zone, while the zone on matrix 25 defined by rows 1'–4' an columns 5', 6' is the drop zone. The remaining area (rows 1–4, columns 1–4) on each matrix is defined as the switching zone.

The example in FIG. 3C shows an add channel of wavelength $\lambda_{add}$ received on fiber A2 of add ports 21. The channel is directed from port A2 on mirror 5/2 (shown in dark grey) of add/drop zone of matrix 15, from where it is reflected on mirror 2/3' (also shown in dark grey) of matrix 25. Mirror 2/3' directs the add channel to diffraction gratings device 50 on area b2 so that add channels $\lambda_{add}$ is multiplexed over the output fiber corresponding to spot b2, here fiber 12-2.

A drop operation is effected in a similar way. For example, a drop channel $\lambda_{drop}$ is separated from the input DWDM signal received from input fiber 11-1 by diffraction gratings device 40, which directs this channel from spot a1 to a first mirror 1/3 (shown in light grey) within the switching zone of matrix 15. This first mirror directs the drop channel on a mirror in the drop zone of the matrix 25, which is mirror 5/2' (also shown in light grey). Then mirror 5/2' directs the wavelength $\lambda_{drop}$ to the drop port D1.

It is possible to have differently sized add/drop zones on the first and second matrices. In the general case, for an add zone with m rows and n columns, there will be m add ports (fibers), and a maximum of n wavelengths on each add fiber. For a drop zone with m' rows and n' columns, there will be m'drop fibers, and a maximum of m'wavelengths on each fiber.

Figure 4A:
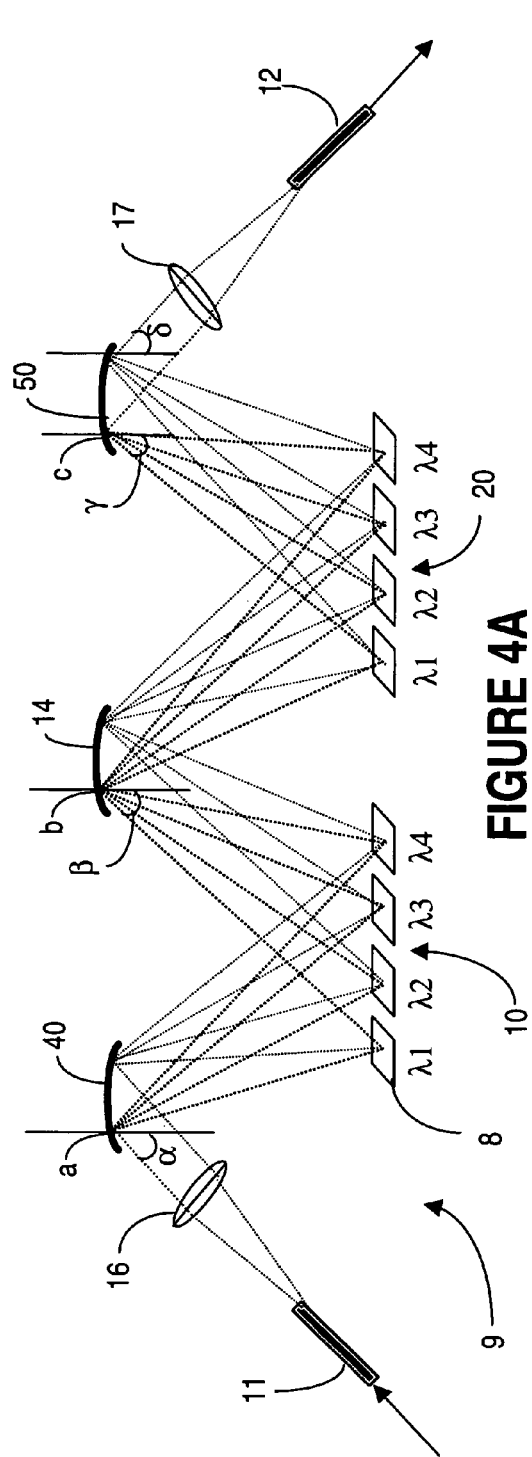
FIG. 4A is a diagram of another embodiment of the photonic switch.
Figure 4B:
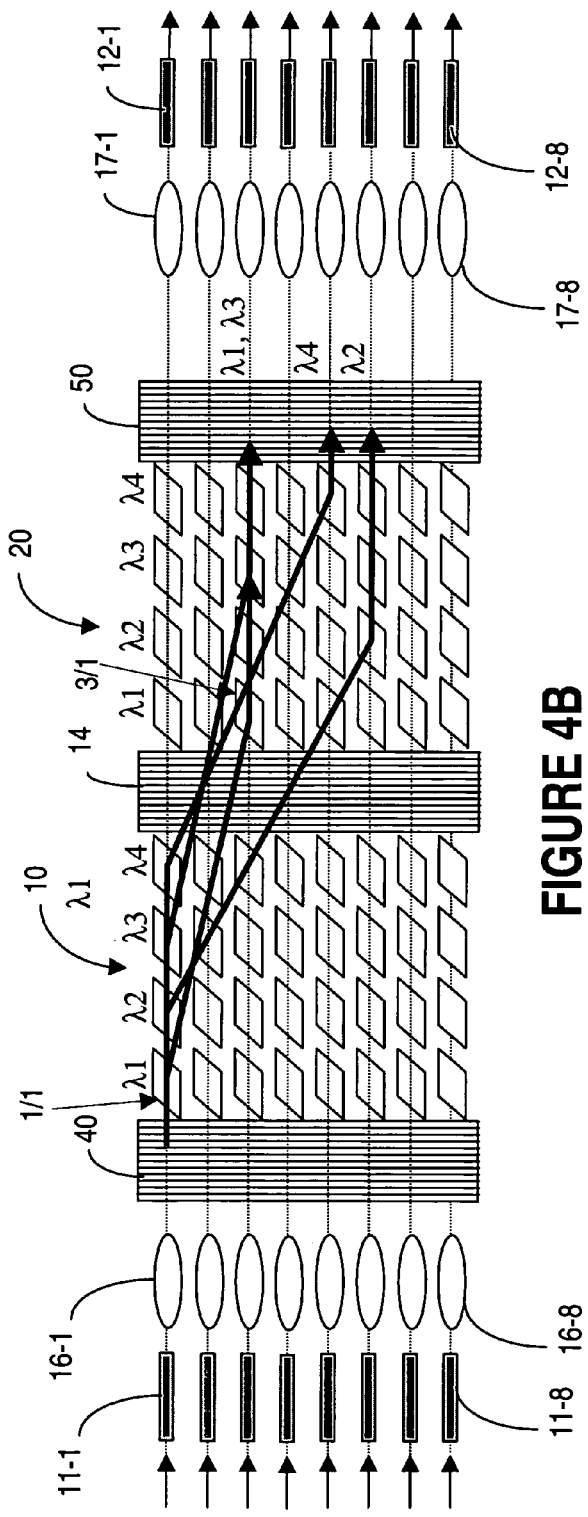
FIG. 4B is a side view of the embodiment in FIG. 4A.

FIG. 4A is a schematic diagram of another embodiment of the photonic switch 9 according to the invention, and FIG. 4B is a side view of the embodiment in FIG. 4A. Control unit 13 is not illustrated for simplification. As well, these figures do not illustrate add/drop operations.

The diagram of FIGS. 4A and 4B show optical elements similar to those in FIG. 3A, namely the collimating and focusing lenses 16 and 17, demultiplexer 40 and multiplexer 50 in the form of diffraction gratings devices, and the 3D-MEMS matrices 10 and 20. This embodiment comprises an additional diffraction grating device 14 arranged in the path of the light between the two matrices 40 and 50. Although the matrices are illustrated in the same plane, it is apparent that they need not necessarily be co-planar.

In this example there are eight input fibers 11-1 to 11-8 and eight output fibers 12-1 to 12-8 (l=l'=8), each carrying four channels λ1 to λ4 (k=4). An input signal Sin(k,i) from an input fiber 11-i is collimated with the respective lenses 16-1 to 16-8, while an output signal Sout(k',i') is focussed on the output fibers 12-1 to 12-8 by focusing lens 17-1 to 17-8. It is to be understood that the number of fibers and of wavelengths are by way of example only, and that the photonic switch can cross-connect a much larger number of wavelengths between a larger number of fibers.

The DWDM signal collimated by lenses 16 is directed onto diffraction gratings device 40, which separates (demultiplexes) the wavelengths, and directs each wavelength on a 3-D MEMS mirror of array 10. The wavelength-input port-mirror assignment is preferably predetermined as discussed in connection with the example of FIGS. 3A–3C.

The wavelength λ1 arrives in the example of FIGS. 4A and 4B on mirror 1/1 of array 10. Mirror 1/1 directs this wavelength on intermediate diffraction gratings device 14, and from there λ1 arrives on a mirror of 3-D MEMS array 20. As the mirrors can rotate about two axes. Diffraction gratings device 14 may receive wavelength λ1 on four different areas of incidence b, each corresponding to a different angle of incidence β, according to the position of mirror in matrix 10 and its orientation.

Diffraction gratings device 14 reflects the light of wavelength λ1 on a mirror of array 20, depending on the angle β and area of incidence b, which as seen above, depends on the orientation of mirror 1/1. Let's say that λ1 arrives on mirror 3/1 of array 20, as shown in FIG. 4B. Mirror 3/1 now directs the light of wavelength λ1 on the diffraction gratings device 50 at an angle of incidence γ and on an area of incidence c.

Angle γ and area c depend again on the position of mirror 3/1 in the matrix 20 and its orientation, and can assume different values, as mirror 3/1 may assume different orientations.

Device 50 reflects the light incident on it at an output angle δ to focusing lens 17-3, and from there to output fiber 12-3. In the example of FIG. 3B, wavelength λ3 is combined with λ1 by device 50, as these wavelengths are directed by the respective mirrors in matrix 20 onto fiber 12-3.

Using two matrices of switches, each wavelength λ1 can be switched form e.g. fiber 11-1 on any of output fibers 12-1 to 12-8. On FIG. 3B, λ1 enters the switch on fiber 11-1, and exits the switch on fiber 12-3.

While the invention has been described with reference to particular example embodiments, further modifications and improvements, which will occur to those skilled in the art, may be made within the purview of the appended claims, without departing from the scope of the invention in its broader aspect.

We claim:

1. A photonic switch for a DWDM network comprising:
   a plurality l of input ports and a plurality l' of output ports;
   an optical demultiplexer for separating a wavelength $\lambda_k$ from an input multichannel signal $S_{in}(k,i)$ received on an input port i of said plurality of input ports, and for directing said wavelength $\lambda_k$ on an assigned ingress area along a predetermined input path;
   a switching block for directing said wavelength $\lambda_k$ along an optical path from said assigned ingress area to an associated egress area selected from a plurality of egress areas;
   an optical multiplexer for directing said wavelength $\lambda_k$ from said associated egress area along a predetermined output path, and for combining said wavelength $\lambda_k$ into an output multichannel signal $S_{out}(k',i')$, transmitted on an output port i' of said plurality of output ports;
   wherein at least one of the optical demultiplexer and optical multiplexer includes a diffraction grating;
   wherein said switching block comprises a three-dimensional switch fabric for cross-connecting said wavelength $\lambda_k$ from said input multichannel signal $S_{in}(k,i)$ to said output multichannel signal $S_{out}(k',i')$ and a control unit for selecting said associated egress area and for configuring said switch fabric to direct said wavelength along an adaptable path between said assigned ingress area and said associated egress area and,
   wherein said switch fabric comprises an input matrix with K rows and l columns of input optical switching elements defining a first plane, and an output matrix with K' rows and l' columns of output optical switching elements defining a second plane; wherein each input port of said plurality of input ports is associated with a column of said input matrix and each wavelength arriving on said each input port is associated with a row of said input matrix, and wherein each output port of said plurality of output ports is associated with a column of said output matrix and each wavelength transmitted at each said output port is associated with a row of said output matrix and wherein said adaptable path transits said switch fabric such that an input optical switching element of said input matrix redirects said wavelength away from the first plane towards the second plane to an output optical switching element of said output matrix.

2. A photonic switch as claimed in claim 1, wherein said switching elements have a minimum of four degrees of freedom of orientation.

3. A photonic switch as claimed in claim 1, wherein said switching elements are 3D MEMS mirrors.

4. A photonic switch as claimed in claim 1, wherein said optical demultiplexer and said input ports are arranged in a predetermined position relative to each other along said predetermined input path, for separating each input multichannel signal into component wavelengths according to an angle of incidence of said input multichannel signal on said demultiplexer.

5. A photonic switch as claimed in claim 4, wherein said demultiplexer and said input matrix are arranged in a predetermined position relative to each other along said predetermined input path, for directing each said component wavelength from said demultiplexer to said input matrix according to said wavelength $\lambda_k$ and said input port i.

6. A photonic switch as claimed in claim 1, wherein said multiplexer and said output ports are arranged in a predetermined position relative to each other along said predetermined output path, for combining all wavelengths arriving in a certain area of incidence on said multiplexer within an output port.

7. A photonic switch as claimed in claim 6, wherein said demultiplexer and said output matrix are arranged in a predetermined position relative to each other, for directing each said wavelength $\lambda_k$ from said output matrix to said certain area of incidence according to said wavelength $\lambda_k$ and said input port i.

8. A photonic switch as claimed in claim 7, further comprising optical elements arranged along said predetermined output path for directing said wavelength from said egress area on said output port.

9. A photonic switch as claimed in claim 1, wherein l=l' and i=i'.

10. A photonic switch as claimed in claim 1, wherein K=K', k=k', l=l' and i=i'.

11. A photonic switch as claimed in claim 1, wherein said switch fabric further comprises an add zone for cross-connecting an add wavelength incident on said add zone to said output multichannel signal; and
   said control unit further capable of configuring said switch fabric to direct said add wavelength along an adaptable add path between said add zone and said associated egress area.

12. A photonic switch as claimed in claim 11, further comprising a plurality of add ports.

13. A photonic switch as claimed in claim 12, wherein said input matrix further comprises an add zone of M rows and N columns of input optical switching elements, wherein each add port of said plurality of add ports is associated with a column of said add zone and each wavelength arriving on said each add port is associated with a row of said add zone.

14. A photonic switch as claimed in claim 1, further comprising at least one drop port,
   wherein said switch fabric further comprises a drop zone for cross-connecting a drop wavelength from said input multichannel signal on said drop zone; and
   a control unit for configuring said switch fabric to direct said drop wavelength along an adaptable drop path between said assigned ingress area and said drop zone.

15. A photonic switch as claimed in claim 14, further comprising a plurality of drop ports.

16. A photonic switch as claimed in claim 15, wherein said switch fabric further comprises a drop zone of M' rows and N' columns of output optical switching elements, wherein each drop port of said plurality of drop ports is associated with a column of said drop zone and each wavelength arriving on said each drop port is associated with a row of said drop zone.

17. A method of routing a wavelength within a photonic three dimensional switch fabric of a DWDM network, comprising:
   pre-establishing an input optical path between an input port associated with said wavelength, through an assigned ingress area to an assigned optical input switching element of an input matrix according to a connectivity map, the input matrix including a plurality of input optical switching elements defining a first plane;
   establishing an adaptable path from said assigned optical input switching element to an associated output optical switching element of an output matrix, the output matrix including a plurality of output optical switching elements defining a second plane, wherein said adaptable path transits said switch fabric such that the assigned optical input optical switching element of said input matrix redirects said wavelength away from the first plane towards the second plane and the associated output optical switching element of said output matrix; and
   pre-establishing an output optical path between said associated optical switching element through an associated egress area to an output port of interest according to said connectivity map;
   wherein at least one of the input optical path and the output optical path includes a diffraction grating.

18. A method as claimed in claim 17, further comprising transiting said adaptable route to connect said assigned optical switching element to another optical switching element of said output matrix, whenever said connectivity map changes.

19. A photonic switch for routing a plurality of wavelengths of a DWDM transport network, between a plurality of input ports and a plurality of output ports comprising:
   an all-optical three-dimensional switch fabric for cross-connecting a wavelength $\lambda_k$ from an optical input multichannel signal $S_{in}(k,i)$ to an optical output multichannel signal $S_{out}(k',i')$, along an adaptable optical path;
   a control unit for configuring said adaptable optical path;
   an optical demultiplexer for separating said wavelength $\lambda_k$ from said optical input multichannel signal $S_{in}(k,i)$ and directing said wavelength $\lambda_k$ on an assigned ingress area of said all-optical switch fabric along a predetermined input path; and
   an optical multiplexer for receiving said wavelength $\lambda_k$ received along a predetermined output path from an associated egress area of said all-optical switch fabric, and combining said wavelength $\lambda_k$ with said optical output multichannel signal $S_{out}(k',i')$;
   wherein at least one of the optical demultiplexer and optical multiplexer includes a diffraction grating;
   wherein said all-optical switch fabric comprises an input matrix of K rows and l columns of optical switching elements defining a first plane, and an output matrix with K' rows and l' columns of output optical switching elements defining a second plane,
   wherein said adaptable path transits said all-optical switch fabric such that an input optical switching element of said input matrix and of said first plane redirects said wavelength away from the first plane towards the second plane and an output optical switching element of said output matrix and of said second plane;
   wherein each input port of said plurality of input ports is associated with a column of said input matrix, and each wavelength of said plurality of wavelengths is associated with a row of said input matrix; and
   wherein each output port of said plurality of output ports is associated with a column of said output matrix and each wavelength of said plurality of wavelengths is associated with a row of said output matrix.

20. A photonic switch as claimed in claim 19, further comprising an add port, and wherein said all-optical switch fabric comprises
   an add zone of M rows and N columns of input optical switching elements, wherein said add port is associated with a column of said add zone and each wavelength arriving on said add port is associated with a row of said add zone.

21. A photonic switch as claimed in claim 19, further comprising a drop port wherein said switch fabric comprises
   a drop zone of M' rows and N' columns of optical switching elements,
   wherein said drop port is associated with a column of said drop zone and each wavelength arriving on said drop port is associated with a row of said drop zone.

22. A photonic switch as claimed in claim 1, wherein said input and said output matrices are arranged in two different planes.

23. A photonic switch as claimed in claim 22, wherein said planes are substantially parallel to each other.

24. A photonic switch as claimed in claim 1 wherein said input and output matrices are arranged substantially in the same plane and wherein said switching block further comprises directing means arranged in the path of the light between said input and output matrices.

25. The method of routing a wavelength within a photonic switch of claim 17, wherein at least one of the input optical path and the output optical path includes a diffraction grating.

* * * * *